United States Patent
Hays

(10) Patent No.: US 11,286,148 B2
(45) Date of Patent: Mar. 29, 2022

(54) LIQUID DISPENSER

(71) Applicant: Zachary Hays, Mount Dora, FL (US)

(72) Inventor: Zachary Hays, Mount Dora, FL (US)

(*) Notice: Subject to any disclaimer, the term of this patent is extended or adjusted under 35 U.S.C. 154(b) by 185 days.

(21) Appl. No.: 16/841,482

(22) Filed: Apr. 6, 2020

(65) Prior Publication Data
US 2020/0317499 A1 Oct. 8, 2020

Related U.S. Application Data

(60) Provisional application No. 62/829,295, filed on Apr. 4, 2019.

(51) Int. Cl.
*B67D 1/12* (2006.01)
*F16K 11/065* (2006.01)

(52) U.S. Cl.
CPC .......... *B67D 1/1245* (2013.01); *F16K 11/065* (2013.01); *B67D 2210/00047* (2013.01)

(58) Field of Classification Search
CPC ................ B67D 1/1245; F16K 11/065; B65B 2039/009
USPC ........................ 222/81, 82, 129; 141/236, 244
See application file for complete search history.

(56) References Cited

U.S. PATENT DOCUMENTS

| | | | | |
|---|---|---|---|---|
| 4,226,267 A | * | 10/1980 | Meacham, Jr. | A47J 31/40 141/18 |
| 4,750,643 A | * | 6/1988 | Wortrich | A61M 5/14 222/482 |
| 5,168,905 A | * | 12/1992 | Phallen | B65B 3/12 141/1 |
| 5,823,234 A | * | 10/1998 | Boertz | B67C 3/202 141/67 |

* cited by examiner

*Primary Examiner* — Vishal Pancholi
*Assistant Examiner* — Robert K Nichols, II
(74) *Attorney, Agent, or Firm* — Adrienne C. Love

(57) ABSTRACT

A liquid dispensing apparatus has a main pipe, a plurality of secondary pipes and a plurality of tertiary pipes that allow a user to fill multiple containers simultaneously. The inlet of the main pipe receives a liquid from a liquid source and travels through main pipe, secondary pipes, tertiary pipes and exits outlet into many containers. The diameter of the tertiary pipes is narrower than the diameter of the main pipe which causes an increase in velocity as the liquid travels through device. The apparatus may also contain an option piercing tip with a piercing needle, allowing the user to fill multiple squeeze containers with their lids on.

11 Claims, 16 Drawing Sheets

LIQUID DISPENSER

CROSS-REFERENCES TO RELATED APPLICATIONS

Pursuant to the provisions of 37 C.F.R. § 1.53(c), this non-provisional application claims the benefit of an earlier-filed provisional patent application. The earlier application was assigned U.S. Ser. No. 62/829,295. It lists the same inventor.

STATEMENT REGARDING FEDERALLY SPONSORED RESEARCH OR DEVELOPMENT

Not Applicable

Microfiche Appendix

Not Applicable

BACKGROUND

1. Field of the Invention

This invention relates to the field of devices made for dispensing liquid into containers. Specifically, the invention relates to a mechanism for distributing liquid from a single source into several containers simultaneously.

2. Description of the Related Art

The need to fill multiple containers at once with liquid often occurs in athletic or outdoor environments in which multiple people need to drink liquids from containers, such as bottles at the same time. Currently, containers are individually filled with liquid from a single dispenser from a single source. Typically, this is accomplished by using a prior art drink or liquid cooler, illustrated in FIG. 1. The prior art drink cooler 64 includes a lid 66, handles 70 and a spigot 68. The cooler 64 allows a user 72 to dispense liquid into a single cup, bottle or container 32 from the cooler 64 when by pressing a spigot 68. To fill squeeze containers, the user must remove the caps of the containers to fill them with liquid. The current process takes a considerable amount of time to fill multiple containers. Additionally, when a filled cup, bottle or container is swapped with an empty one, drinking water is often lost. If the liquid source is a running gardening hose or spigot, similar waste may occur.

For the foregoing reasons, there is a need for an easier and quicker way to simultaneously fill more than one container from one liquid source. Additionally, it would be advantageous to fill a squeeze container while the cap is on. The present invention solves these problems by simultaneously filling at least two cups, bottles or containers from one liquid source. It can also be adapted to fill squeeze containers without taking the lids off.

SUMMARY

The present invention is directed to a device that simultaneously fills many containers, bottles or cups with liquid from one source. Additionally, the device may fill a squeeze container either with or without a lid on. A main pipe having a diameter contains a valve in between an inlet and a plurality of secondary pipes that is capable of opening and closing through the turn of a valve handwheel, allowing or stopping the flow of the liquid through the device. A pipe assembly having features of the present invention comprises main pipe which may be attached to a liquid source through an inlet. Main pipe fluidly connects to a plurality of secondary pipes having a diameter. Secondary pipes fluidly connect to tertiary pipes having a diameter and an outlet. Liquid flows from the liquid source into the inlet, through main pipe, plurality of secondary pipes and tertiary pipes and ultimately exits outlets of tertiary pipes into cups or squeeze container. The diameter of main pipe is greater than or equal to the diameter of the plurality of secondary pipes. The diameter of the plurality of secondary pipes is greater than or equal to the diameter of the plurality of tertiary pipes. The diameter of main pipe is greater than the diameter of the plurality of tertiary pipes. It is in this manner that the velocity of the liquid to increase as it travels through device.

Outlet of each tertiary pipe may be attached to the optional reducer coupling tip or an optional piercing tip. The optional reducer coupling tip is placed above a container by a user. The optional piercing tip comprises an adapter attached to the outlet of each of the tertiary pipes and a piercing needle attached to the adapter. With this option, the liquid flows through tertiary pipe, through the piercing tip, and out through the needle end into the squeeze containers. The optional piercing tip allows the user to fill squeeze containers without taking the lids off the containers.

The present invention is capable of filling at least two containers at once and thus will contain at least two tertiary pipes. The main pipe may also contain an optional hose fitting attached to the inlet for use with a liquid source such as a common gardening hose. The main pipe, plurality of secondary pipes and tertiary pipes are preferably made from PVC or other durable liquid-safe material. The optional reducer coupling tip further increases the velocity of liquid, as does the optional piercing tip.

These and other features, aspects, and advantages of the present invention will become better understood with reference to the following description, appended claims, and accompanying drawings.

Figure 1:
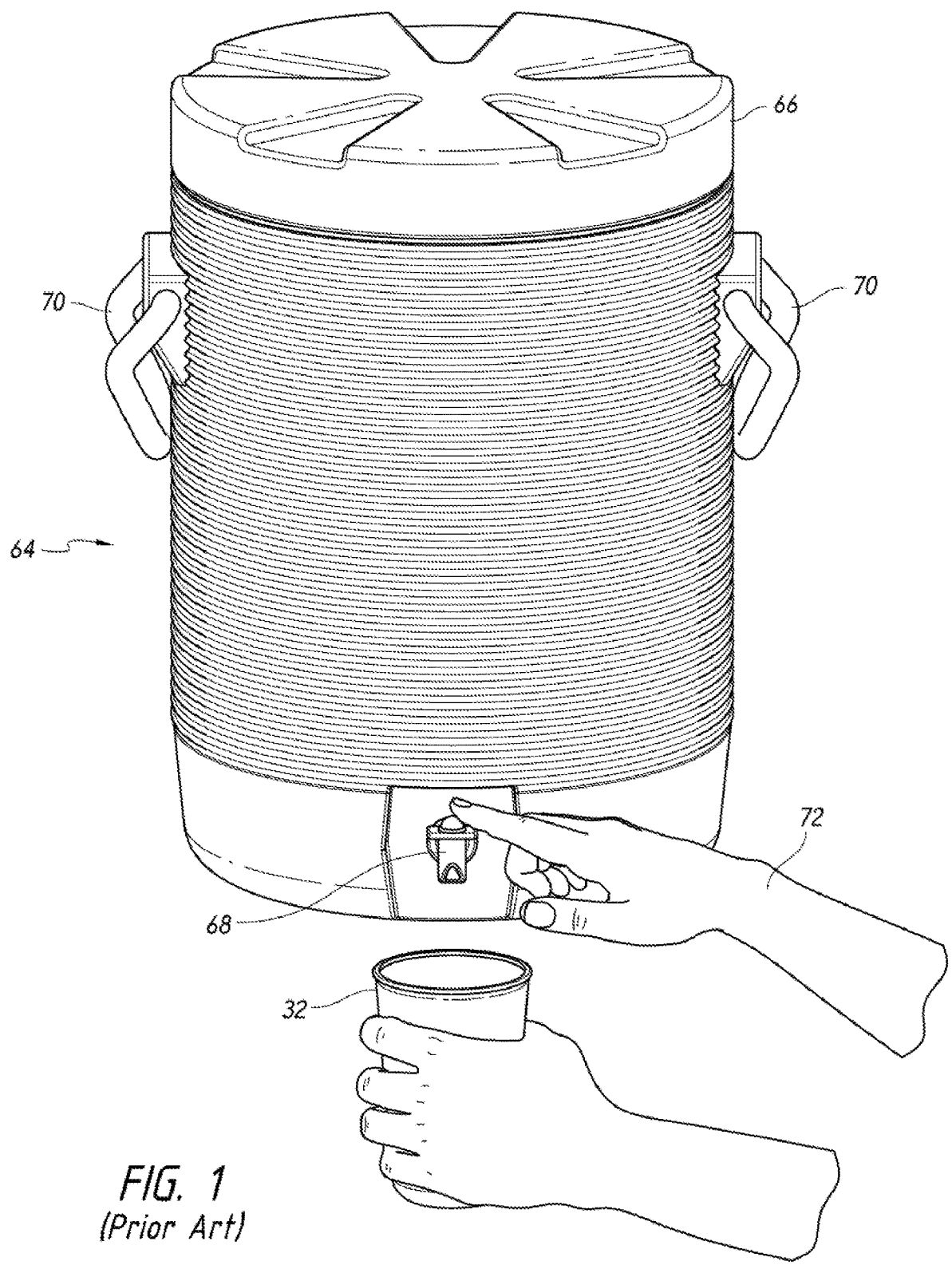
FIG. 1 is a perspective view, showing a prior art liquid dispenser.

REFERENCE NUMERALS IN THE DRAWINGS 20 device
22 main pipe
24 inlet
26 outlet
28 hose
30 liquid
32 container
34 valve
35 ball
36 handwheel
38 central bore
44 secondary pipe
46 tertiary pipe
50 tip (reducer coupling tip)
52 piercing needle
54 adapter
56 piercing tip
58 hose fitting
60 squeeze container lid
62 container holder
64 liquid cooler
66 liquid cooler lid
68 spigot
70 handle
72 user
74 needle end
76 self-sealing opening

DETAILED DESCRIPTION

Although reference is made to particular features of the invention throughout this disclosure, it is to be understood that the invention includes all possible combinations of these particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Figure 2:
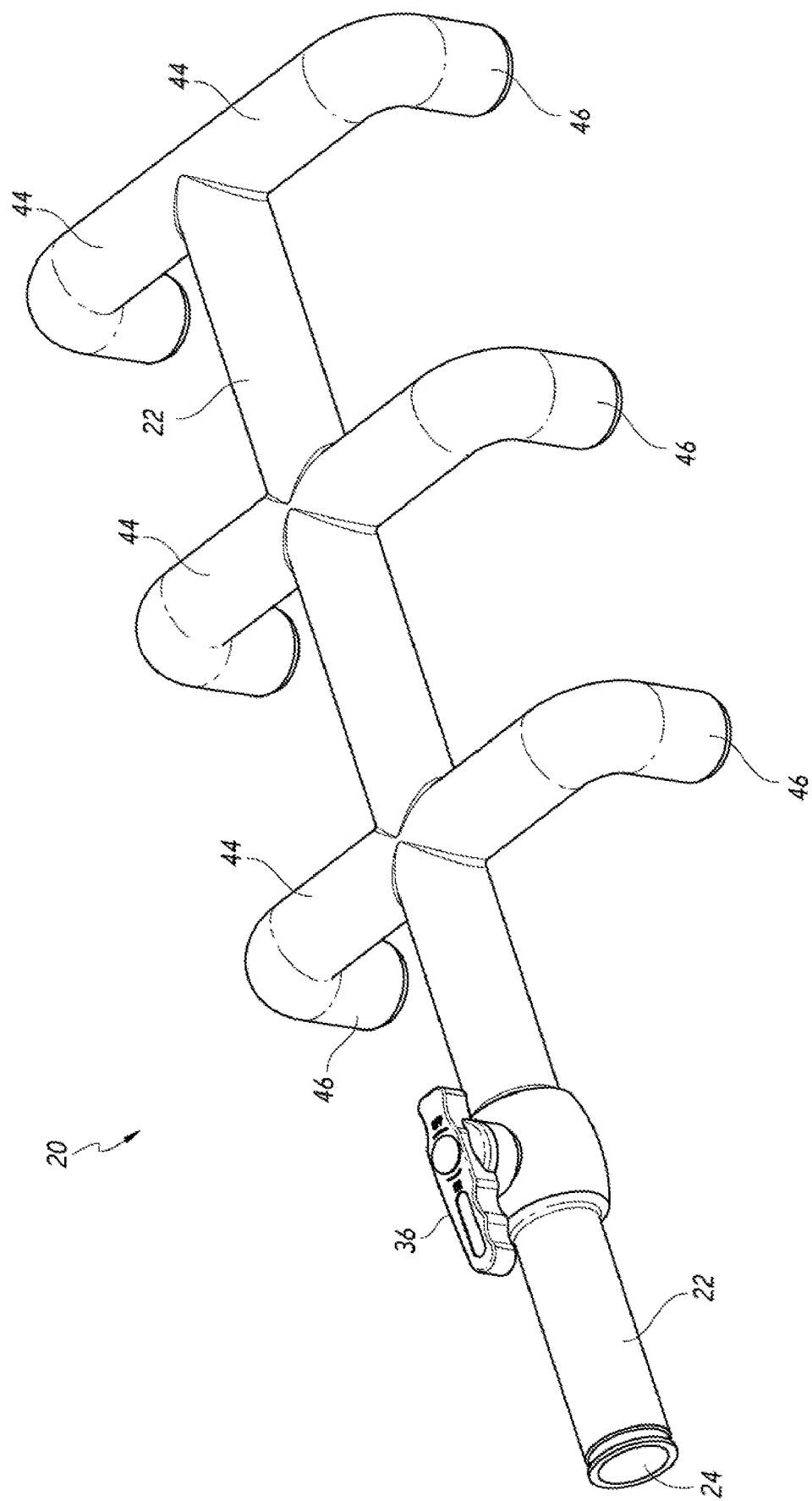
FIG. 2 is a perspective view, showing one embodiment of the present device with the valve in an open state.
Figure 4:
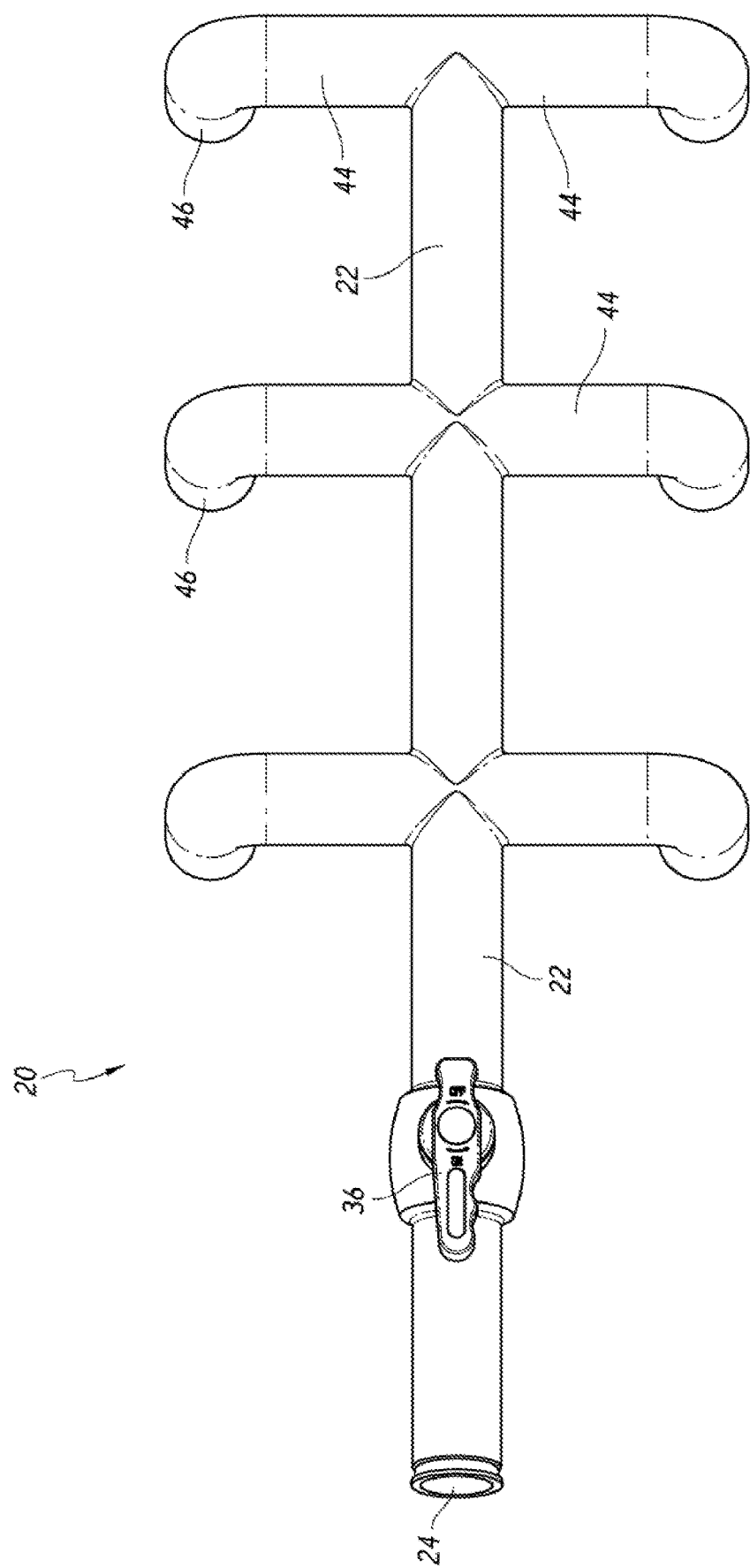
FIG. 4 is a top plan view, showing the present device.
Figure 5:
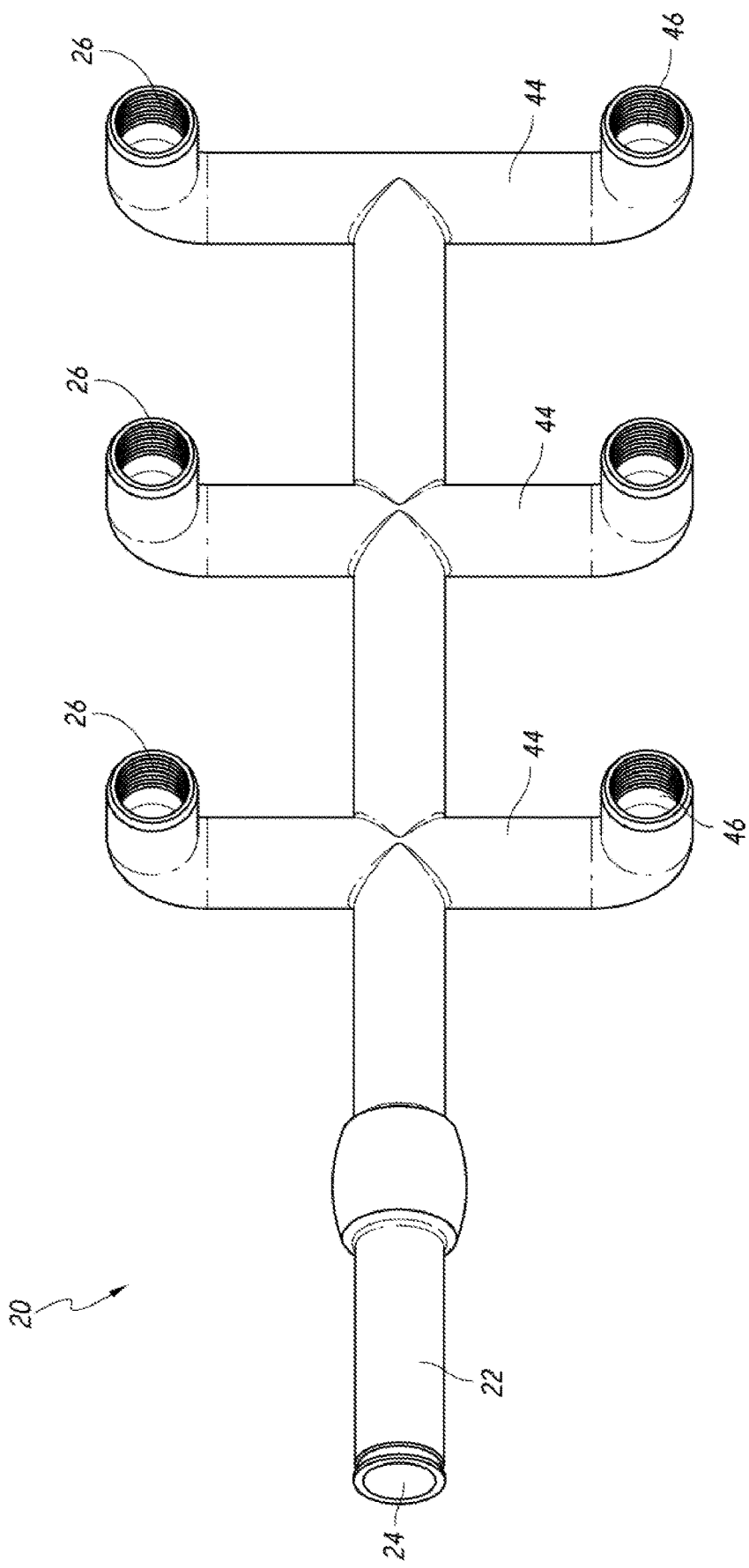
FIG. 5 is a bottom plan view, showing the present device.

FIGS. 2, 4, and 5 illustrate three different views of one embodiment of the present invention. Device 20 generally comprises main pipe 22 and a plurality of secondary pipes 44 which may be made from any durable water-resistant material such as polyvinyl chloride ("PVC"). PVC is a rigid plastic polymer that is commonly used in pipes in construction for plumbing, flooring and electrical cable insulation. Inlet 24 is fluidly connected to a plurality of outlets 26 by main pipe 22, a plurality of secondary pipes 44 and tertiary pipes 46. Valve 34 (as shown in FIG. 9) including handwheel 36 is preferably attached to or integrated with main pipe 22 in between inlet 24 and secondary pipes 44 (prior to the first junction point at which main pipe 22 breaks off into secondary pipes 44).

Figure 9:
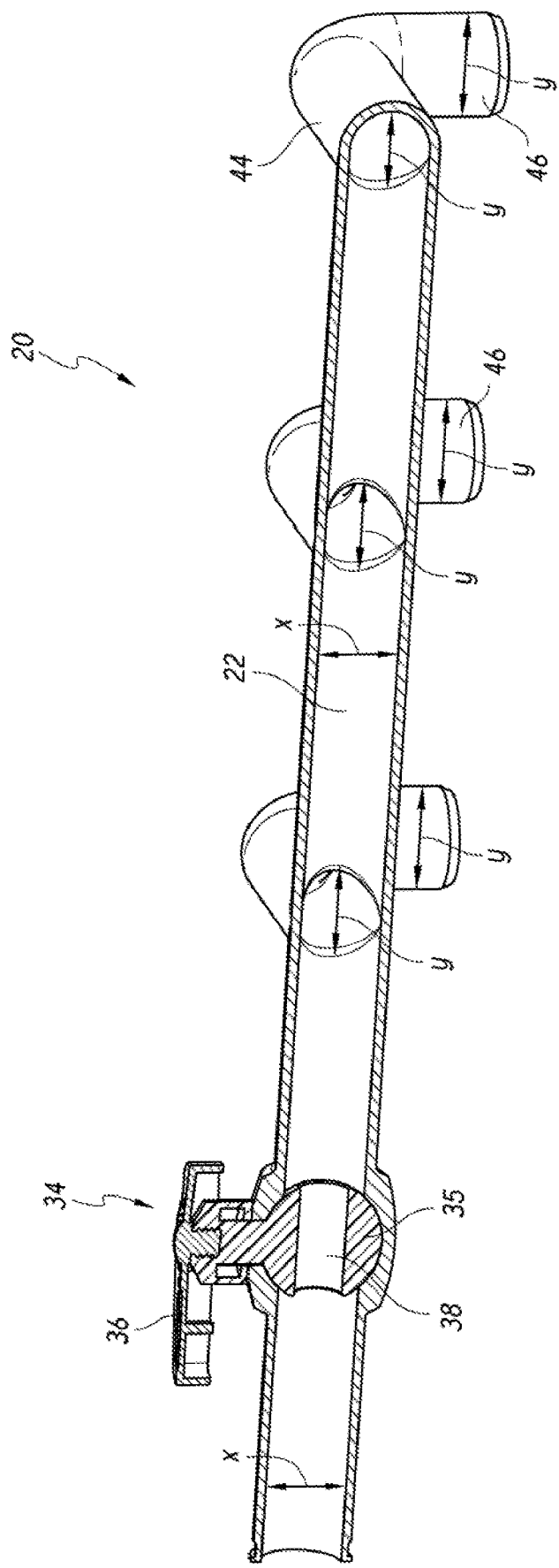
FIG. 9 is a cut-away view, showing the interior of the present device.
Figure 10:
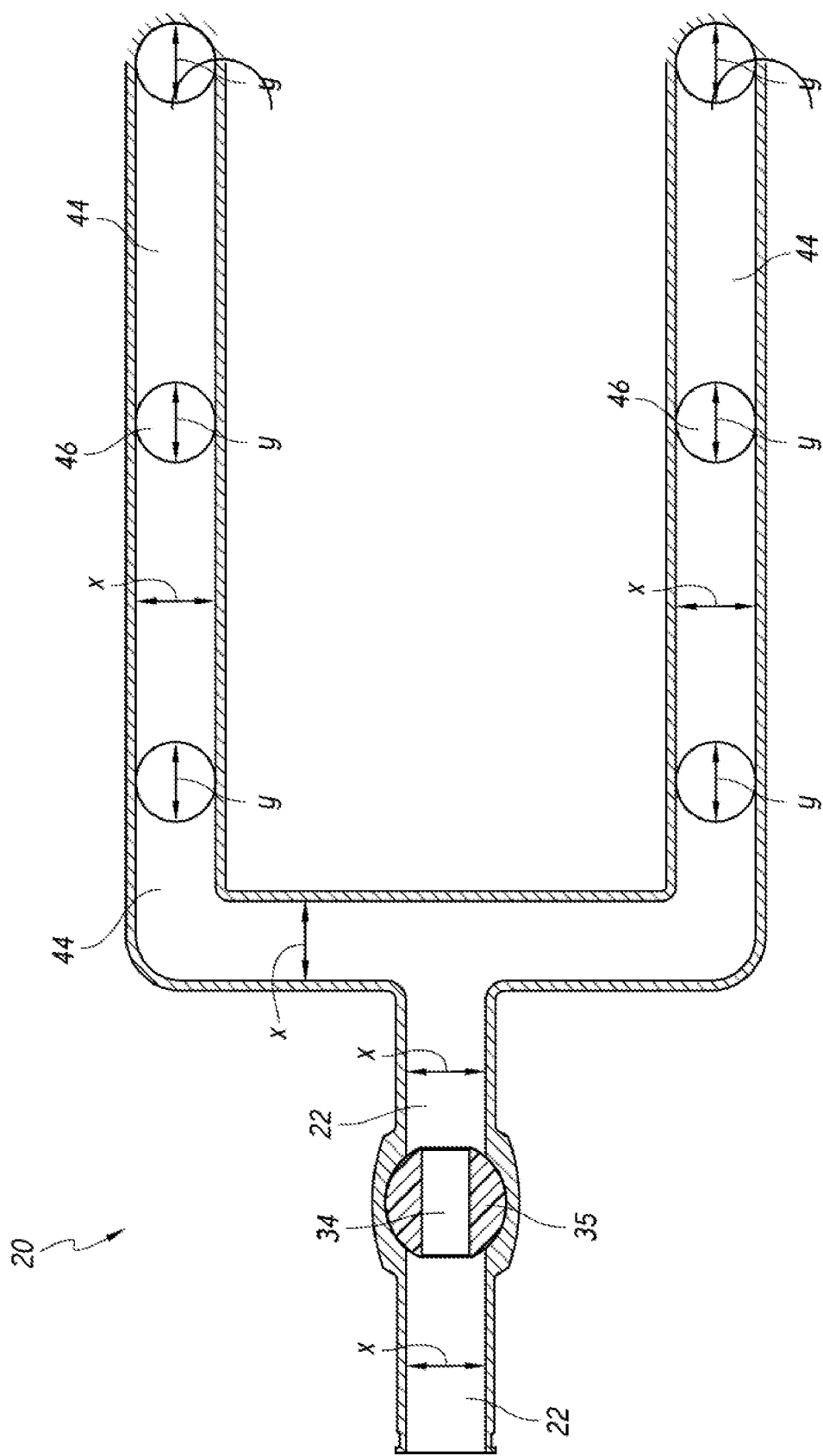
FIG. 10 is a cut-away view, showing the interior of the present device.

Valve 34, as shown in FIG. 9, is capable of being in an open state, wherein the liquid is flowing through the valve 34, or a closed state, wherein the liquid is not able to flow through the valve 34. Valve 34 is opened or closed by the turn of handwheel 36. As shown in FIGS. 9 and 10, valve 34 can be a ball valve. Ball valves are particularly useful for on/off control without experiencing a pressure drop. As handwheel 36 is turned, sphere 35 also turns, allowing liquid 30 to flow through the open core of sphere 35 into main pipe 22 towards secondary pipes 44. Valve 34 may also be a swing check valve including a disc hinged at an arm (not shown). Disc can be biased downward by adding a spring or weight proximate arm. Again, in a closed position, valve 34 prevents the flow of liquid 30 from the first end of main pipe 22 to the second end of main pipe 22 towards secondary pipes 44. It is important to note that while two examples of valves are provided, any known valve that can perform the function of allowing a user to turn on or off the flow of liquid through device 20 can be utilized. A valve is advantageous in the present invention since it can be closed by user when device 20 is not in use. This allows the user to save time and lessen liquid waste because the main liquid source does not have to be turned off to stop the flow of liquid through device 20.

Figure 3:
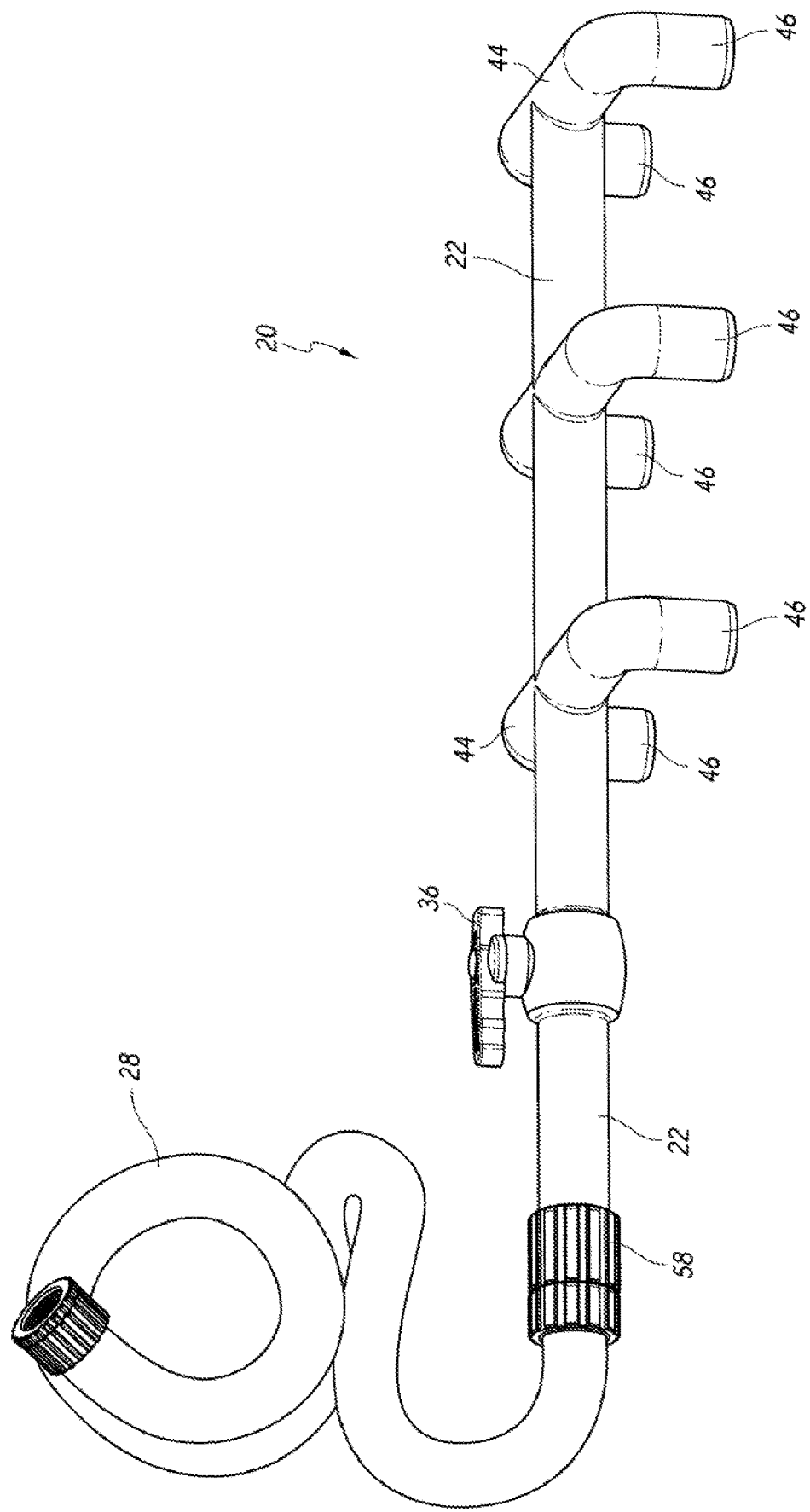
FIG. 3 is a side perspective view, showing the present device with an optional hose fitting and attachment point for one type of prior art liquid source (a prior art hose)

FIG. 3 shows a side elevation view of the present invention with an optional hose fitting 58. A prior art common gardening hose 28 may be attached to device 20 through optional hose fitting 58 attached around inlet 24 of main pipe 22. Optional hose fitting 58 is a connector having internal threading that allows the end of a prior art hose 28 to screw into device 20, providing a secure and liquid tight connection. Optional hose fitting 58 can be used to allow for the attachment of a prior art hose 28 to device 20, providing easy and constant liquid access.

FIGS. 4 and 5 show a view from the top and bottom of the present device, wherein the reader can appreciate the structure of the device 20, including outlets 26 shown in FIG. 5, where liquid exits tertiary pipes 46.

Figure 6:
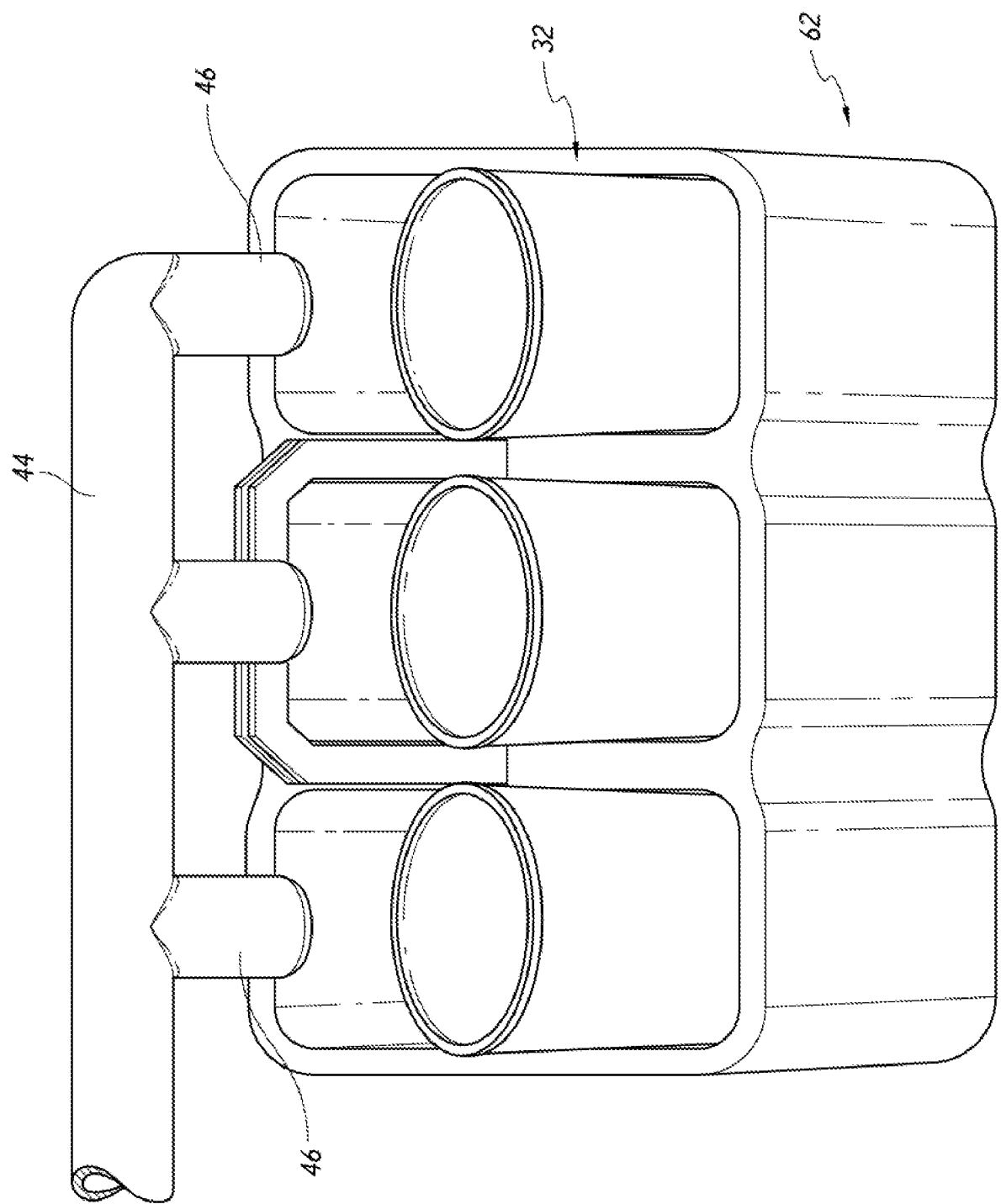
FIG. 6 is a side view, the present device when used with prior art containers in a prior art bottle holder.

FIG. 6 illustrates device 20 in use with prior art containers 32 in a prior art holder 62. Holder 62 is a commonly used "six pack" water bottle holder. Thus, tertiary pipes 46 are spaced in a manner that will accommodate the space between each container 32 when placed in holder 62. FIG. 6 shows a side elevation view, where at least three containers 32 are placed underneath device 20. The reader will appreciate that while the illustration in FIG. 6 only shows three containers 32, the device 20 can accommodate six—such that six tertiary pipes 46 align with a "six pack" water bottle holder. Each container 32 is placed directly beneath one tertiary pipe 46.

Figure 7:
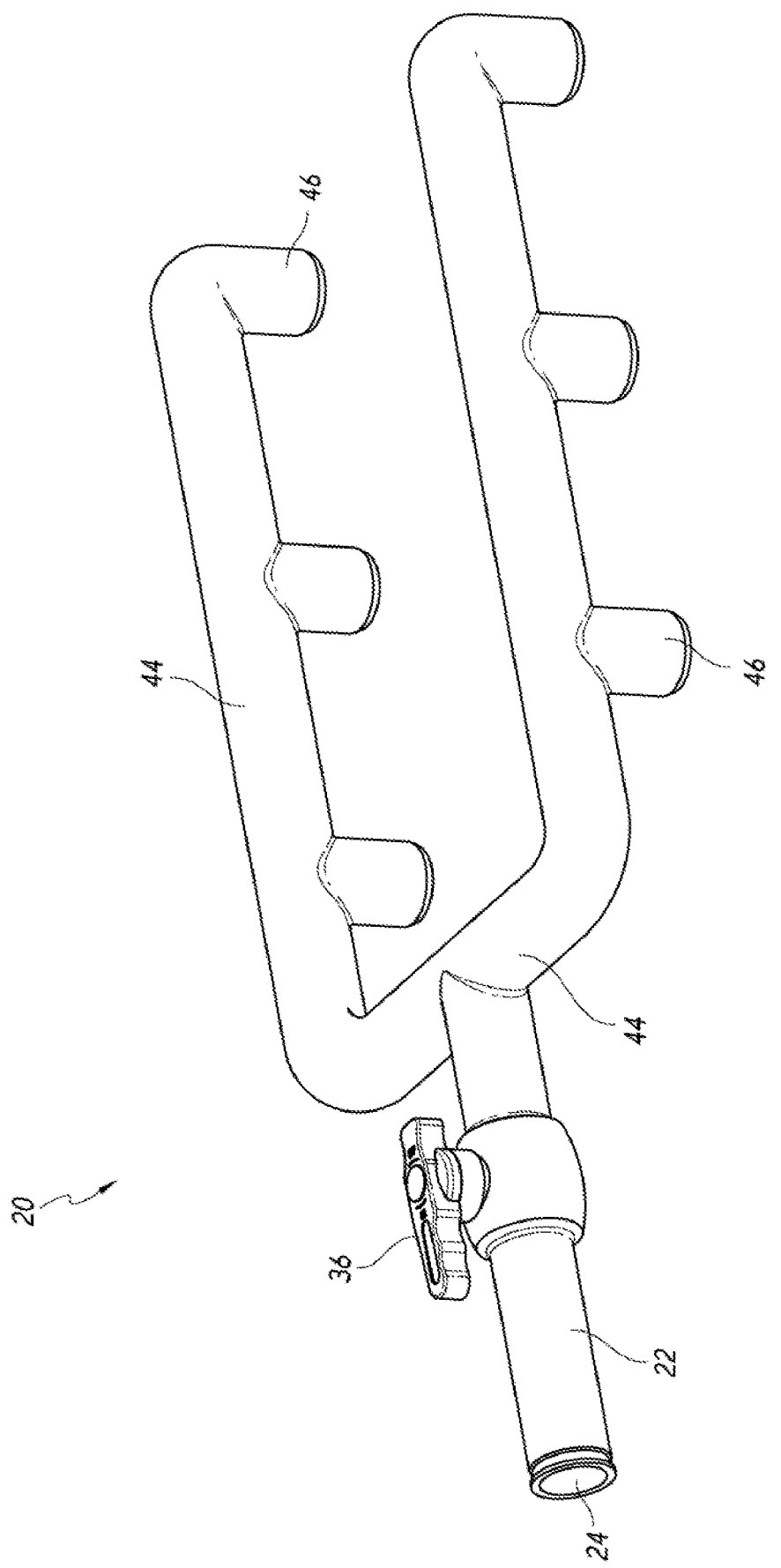
FIG. 7 is a perspective view, showing another embodiment of the present device.

FIG. 7 shows a perspective view of another embodiment of the present invention. This embodiment also comprises inlet 24 and a plurality of outlets 26 (shown in FIG. 8) fluidly connected by main pipe 22, a plurality of secondary pipes 44 and a plurality of tertiary pipes 46. Valve 34 having handwheel 36 is preferably placed in between inlet 24 on main pipe 22 and secondary pipes 44. Tertiary pipes 46 each contain outlet 26 where the liquid will be dispensed.

Figure 8:
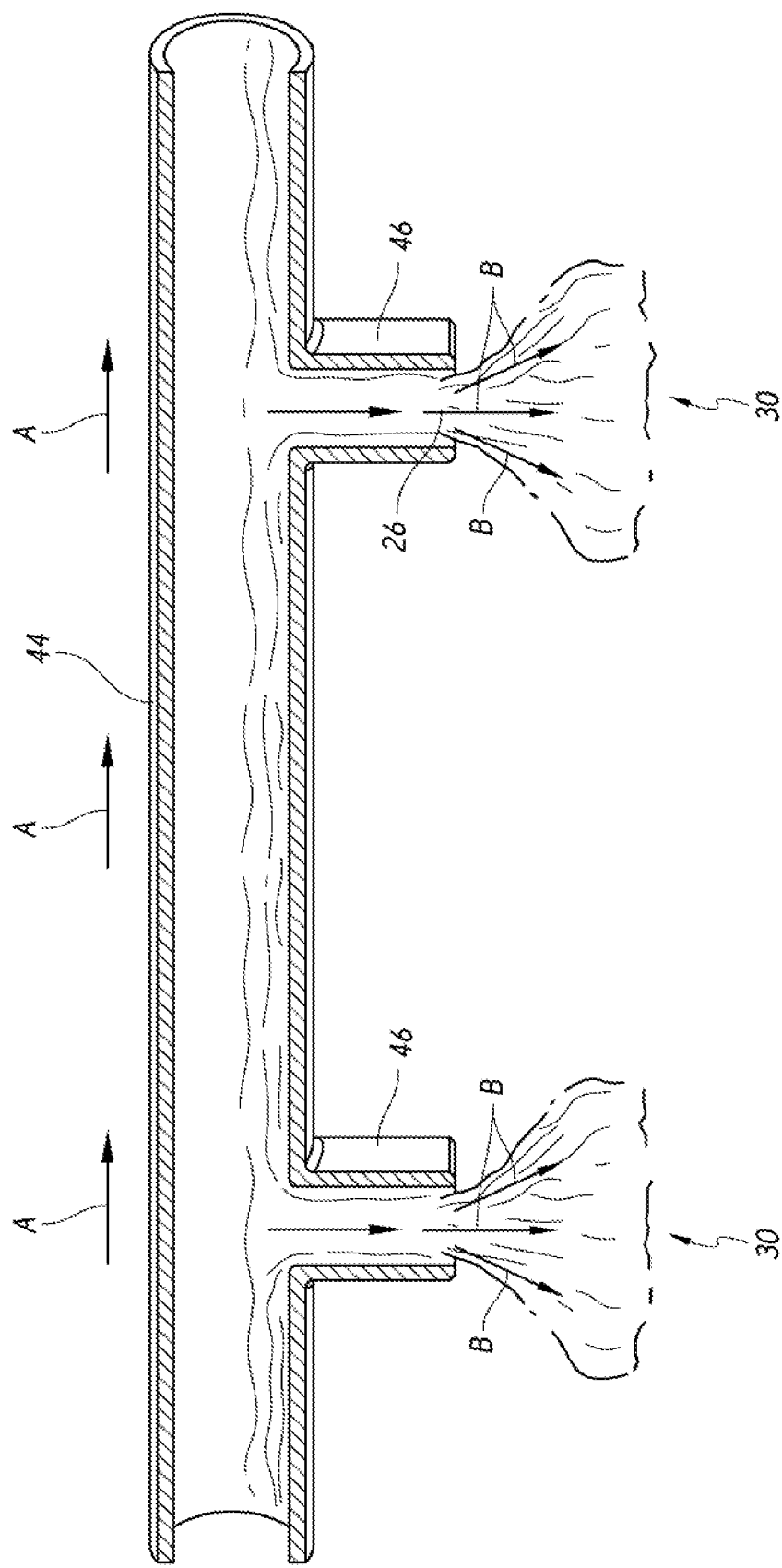
FIG. 8 is a cut-away view, illustrating the flow of liquid through the present device.

FIG. 8 is a cut-away view, showing the flow of a liquid 30 through device 20 and the method in which the containers 32 are filled, when device 20 is in use. The reader will appreciate that liquid entering main pipe 22 (not shown) flows along a horizontal plane, just as it would in FIGS. 3-5. Upon entering secondary pipes 44 liquid 30 is angularly displaced by approximately 90 degrees along that same horizontal plane (see FIG. 7). Returning to FIG. 8, liquid 30 fills up secondary pipes 44 while traveling along that horizontal plane. Liquid 30 is then redirected downward by 90 degrees into tertiary pipes 46 along a now vertical plane towards outlets 26. The reader will appreciate that, because of the design of device 20, liquid 30 will be angularly displaced by approximately 90 degrees from a horizontal plane to a vertical plane to flow from secondary pipes 44 through tertiary pipes 46 and exit device 20 through outlets 26.

FIG. 9 is a cut-away view of one embodiment of the present invention and illustrates how liquid 30 flows through device 20. Main pipe 22 has a cross section (x), which is greater than the cross section of secondary pipes 44 (y). Thus, liquid 30 enters through inlet 24 and passes through valve 34 (in an open state) in main pipe 22. Liquid 30 passes through secondary pipes 44 and, because the width (diameter y) is narrower, liquid 30 increases in speed as it enters tertiary pipes 46 and ultimately exits device 20 through outlets 26. The increase of speed in the flow of liquid 30 can be explained by Bernoulli's principle. As the width of the pipe decreases, pressure decreases and the fluid gains velocity and kinetic energy ultimately increasing the fluid's speed.

FIG. 10 is a cut-away view of another embodiment of the present invention showing main pipe 22 and secondary pipes 44 with the same cross-section diameter (x). The cross-section (or diameter) of main pipe 22 and secondary pipes 44 is greater than the cross section (or diameter) of tertiary pipes 46 (y). Therefore, liquid 30 enters through inlet 24 and passes through valve 34 (in an open state) in main pipe 22. Liquid 30 passes through secondary pipes 44 and ultimately into tertiary pipes 46. Because the width of tertiary pipe 46 (y) narrows liquid 30 will increase in speed as it passes through tertiary pipe 46 and exits outlets 26.

Figure 11:
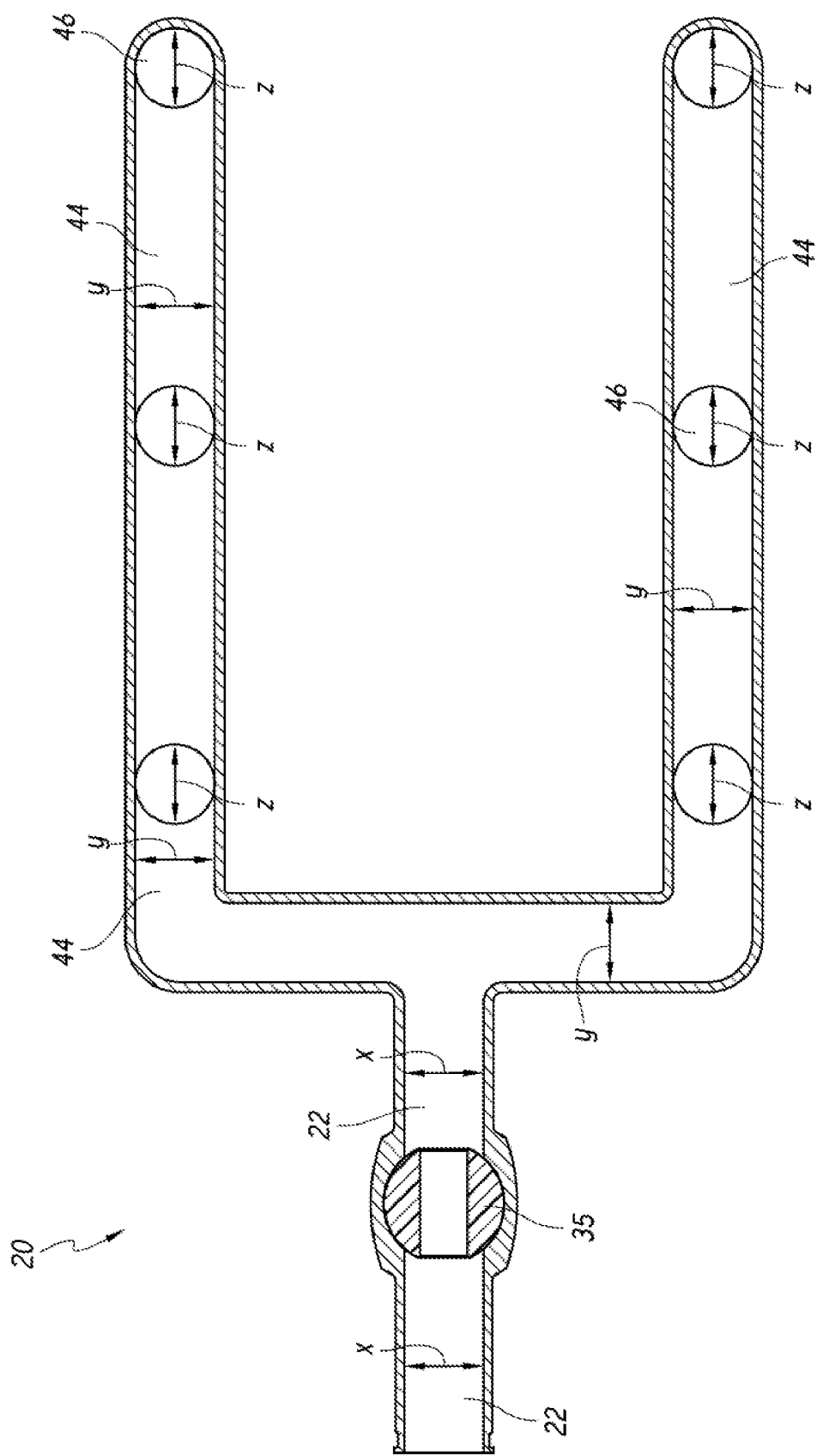
FIG. 11 is a cut-away view, showing the interior of the present device.

FIG. 11 is a cut-away view of another embodiment of the present invention where main pipe 22 has a cross-section or diameter (x), secondary pipes have a cross-section or diameter (y), and tertiary pipes 46 have a cross-section or diameter (z). The cross section (x) of main pipe 22 is greater than the cross-section of secondary pipes (y). Tertiary pipes 46 are narrower still, shown in the illustration as diameter (z). Thus, liquid 30 enters through inlet 24 and passes through valve 34 (in an open state) in main pipe 22. Liquid 30 then enters secondary pipes 44 and increases in velocity due to the smaller width (diameter) of the pipe. Finally, liquid 30 passes through the narrower diameter (z) of tertiary pipes 46 and increases in speed before passing through outlets 26.

Figure 12:
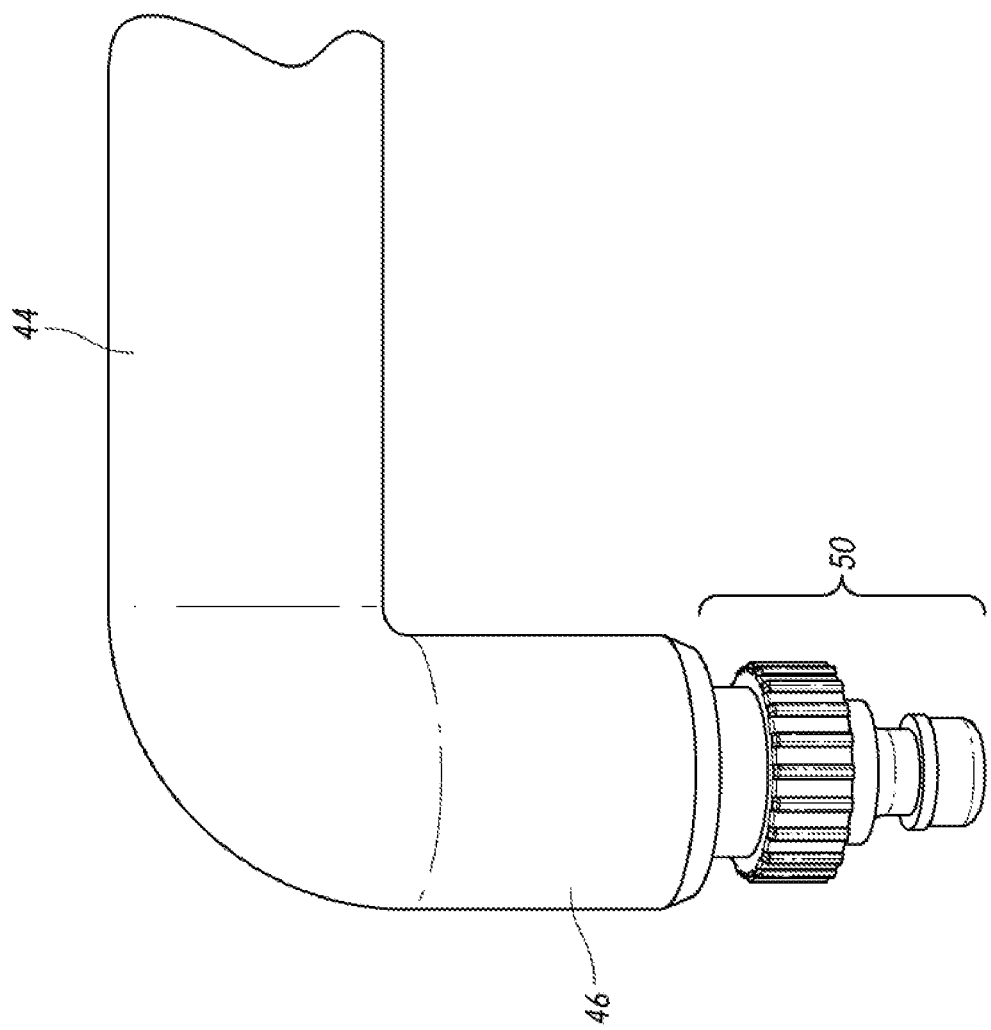
FIG. 12 is an exploded view, showing a secondary pipe of the present device with an attached optional tip.

FIG. 12 is an exploded view of the device 20, illustrating the attachment of an optional tip (reducer coupling tip) 50 to the outlet 26 of the tertiary pipes 46. The reducer coupling tip 50 increases the velocity of the liquid 30 further, since the reducer coupling tip 50 has a narrower width than the tertiary pipes 46.

Figure 13:
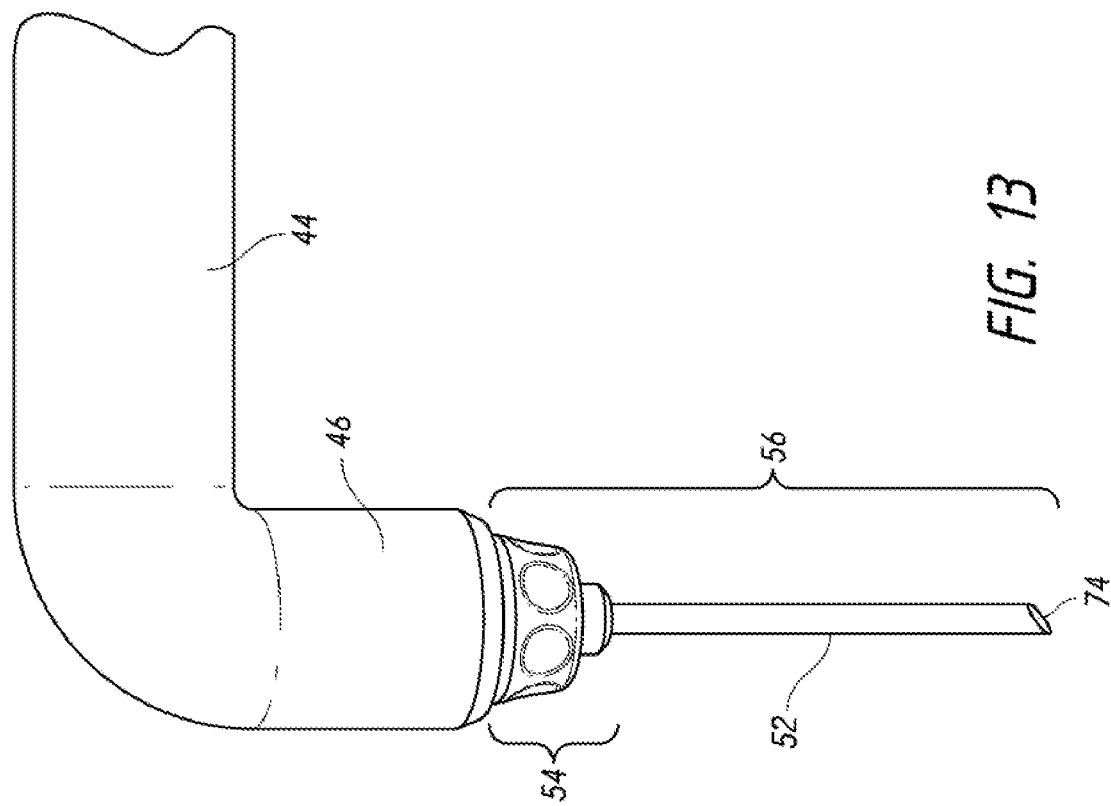
FIG. 13 is an exploded view, showing a secondary pipe of the present device with an optional attached piercing needle.
Figure 14:
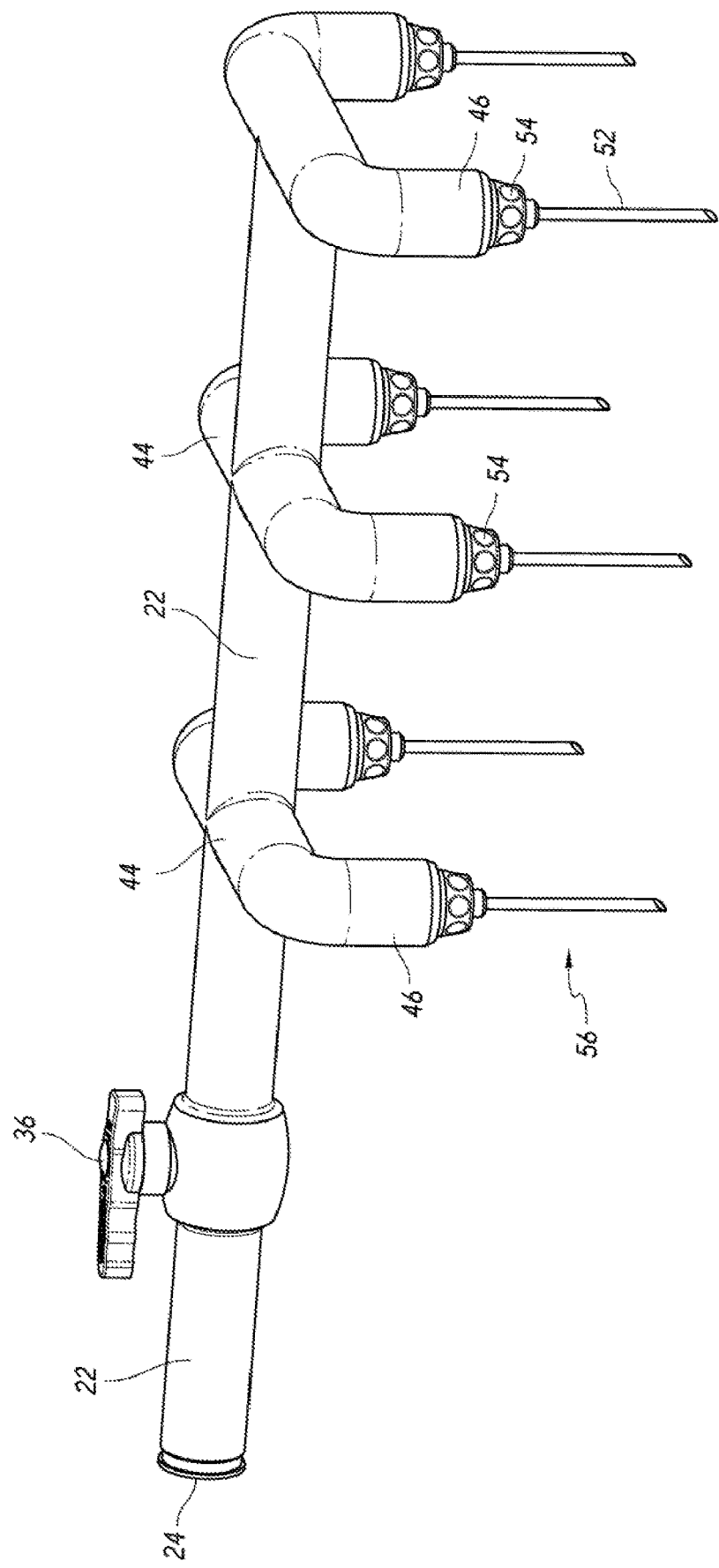
FIG. 14 is a side view, showing the present device.

FIGS. 13 and 14 illustrate the attachment of optional piercing tip 56 to device 20 (not shown). Optional piercing tip 56 is attached to outlet 26 (not shown) of tertiary pipe 46. Piercing tip 56 comprises an adapter 54 attached to outlet 26 of tertiary pipe 46, and piercing needle 52 attached to the adapter 54 which contains needle end 74. Like optional reducer coupling tip 50, piercing tip 56 has a narrower width (diameter) than the tertiary pipes 46, allowing for even greater speed of the liquid 30. Liquid 30 gains velocity and kinetic energy and passes through needle end 74. Optional piercing tip 56 is for use with a squeeze container lid 60 on.

Figure 15:
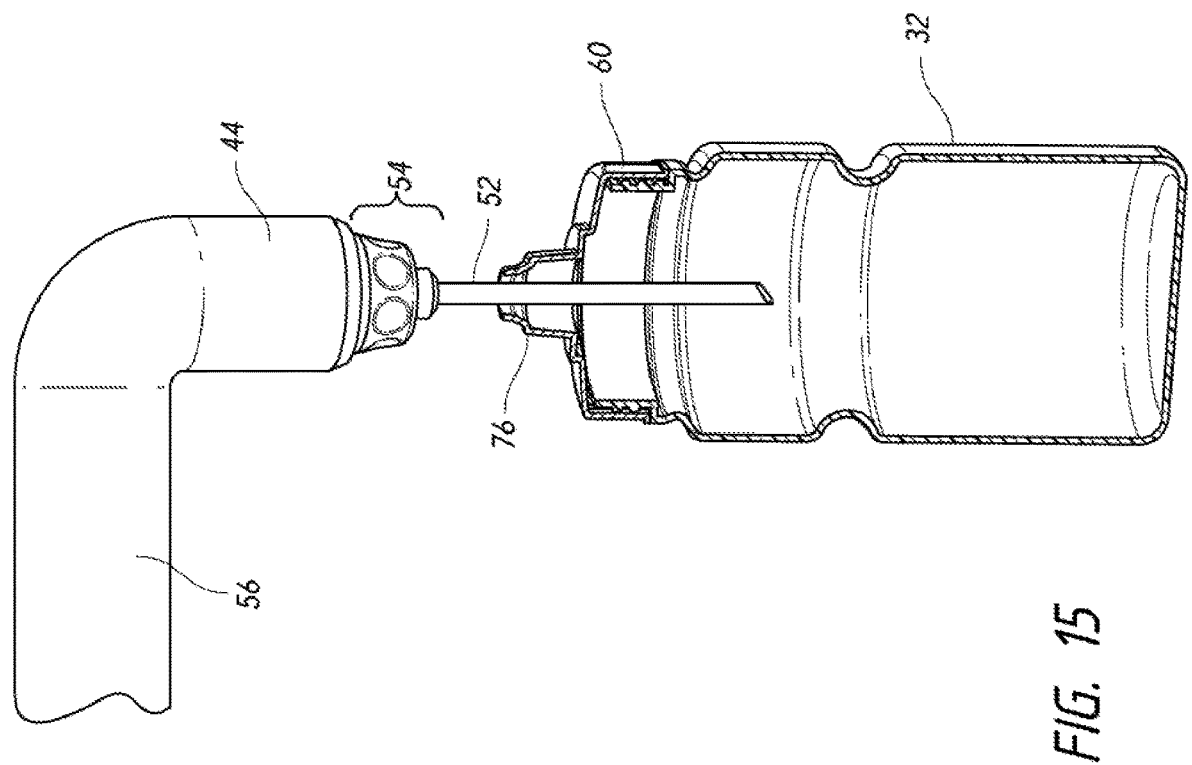
FIG. 15 is a cut-away view, showing the present device inserted into a prior art squeeze container lid.

FIG. 15 is a cut-away view of device 20 (not shown), showing use of optional piercing tip 56. Lid 60 contains a self-sealing opening 76, which seals when not in use but is partially opened with pressure or through insertion of the optional piercing tip 56 through the self-sealing opening 76. Self-sealing opening 76 is typically made of pliable material such as silicone that has been cut in the middle, typically creating a cross cut. Squeeze container lid 60 is prior art, but device 20 takes advantage of such technology. Piercing needle 52 pierces self-sealing opening 76 of squeeze container lid 60 such that user 72 can fill squeeze containers 32 without having to take off squeeze container lids 60.

Figure 16:
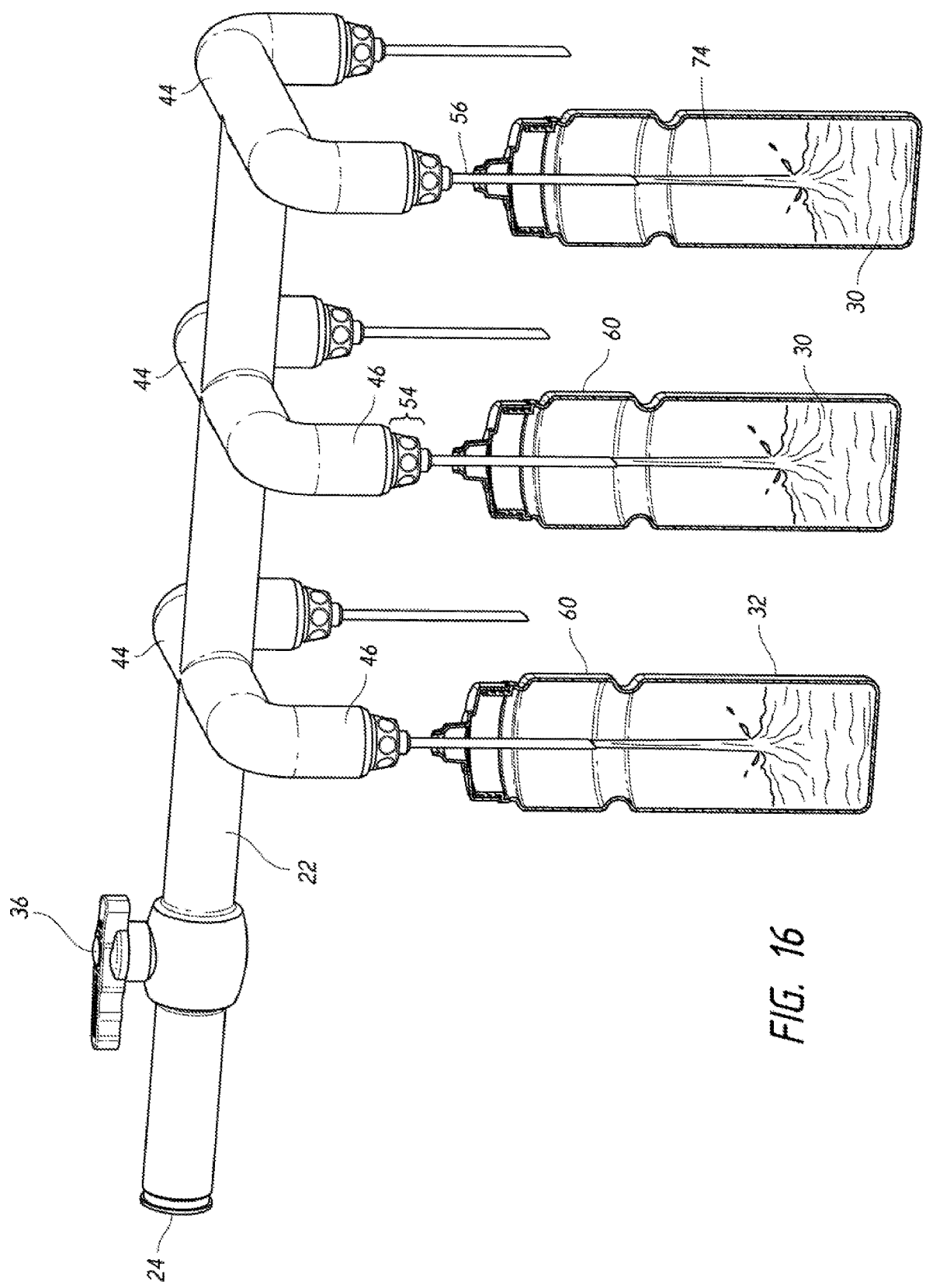
FIG. 16 is a side view, showing the present device in use with a cut-away view of the prior art squeeze bottles with lids.

FIG. 16 shows device 20 in use with valve handwheel 36 placed in an open state, and a cut-away view of containers 32 and squeeze container lids 60. Inlet 24 receives liquid 30, which then travels through main pipe 22 into secondary pipes 44 and finally tertiary pipes 46. Optional piercing tips 56 are attached to outlet 26 of tertiary pipes 46. Piercing needle 52 of piercing tip 56 can be inserted into self-sealing opening 76 of squeeze container lid 60, which is attached to container 32. Liquid 30 flows from tertiary pipe 46, through piercing tips 56, out through needle end 74, and into container 32.

The previously described embodiment of the present invention has many advantages. The invention saves a considerable amount of time with the ability to fill at least two containers simultaneously. The invention also wastes less liquid since less time will be spent swapping out the series of containers 32 once they are filled with empty ones. The invention may also give the user the convenience of not having to take off the cap 60 of the series of containers 32, which also saves considerable time and hassle.

The particular embodiments described are preferred due to their advantages over the prior art but are not required in all embodiments of the invention. Importantly, the invention does not require that all the advantageous features described herein be incorporated into every embodiment of the invention.

The preceding description contains significant detail regarding the novel aspects of the present invention. It should not be construed, however, as limiting the scope of the invention but rather as providing illustrations of the preferred embodiments of the invention. As an example, device 20 can be any shape such that liquid may flow through the plurality of secondary pipes as described. Thus, the scope of the invention should be fixed by the following claims, rather than by the examples given.

Having described my invention, I claim:

1. A device for dispensing a liquid into a series of containers simultaneously, configured to attach to a liquid source, comprising:
   a main pipe, having a diameter and an inlet,
   a plurality of secondary pipes, having a diameter, fluidly connected to said main pipe at a junction point,
   a valve having a handwheel, located between said inlet and said junction point,
   a plurality of tertiary pipes, having a diameter, fluidly connected to said plurality of secondary pipes,
   wherein said plurality of tertiary pipes have a plurality of outlets,
   wherein said diameter of said main pipe is greater than or equal to said diameter of said plurality of secondary pipes,
   wherein said diameter of said plurality of said secondary pipes is greater than said diameter of said plurality of tertiary pipes, such that said liquid increases in velocity as said liquid flows through said device.

2. The device as recited in claim 1, further comprising a reducer coupling tip removably attached to said outlet of said plurality of tertiary pipes.

3. The device as recited in claim 2, further comprising a piercing tip removably attached to said reducer coupling tip, wherein said piercing tip.

4. The device as recited in claim 1, wherein said plurality of secondary pipes consists of six secondary pipes and said plurality of tertiary pipes consists of six tertiary pipes.

5. The device as recited in claim 1, wherein said plurality of secondary pipes consists of two secondary pipes and said plurality of tertiary pipes consists of six tertiary pipes.

6. A device for dispensing a liquid into a series of containers simultaneously, configured to attach to a liquid source, comprising:

a main pipe, having an inlet and a valve, a plurality of secondary pipes fluidly connected to said main pipe at a junction point, said valve is between said inlet and said junction point, a plurality of tertiary pipes fluidly connected to said plurality of secondary pipes, wherein said plurality of tertiary pipes have a plurality of outlets, wherein said liquid enters said main pipe along a horizonal plane, wherein said valve is capable of stopping the flow of liquid prior to liquid reaching said junction point, wherein said plurality of secondary pipes cause said liquid to be redirected along said horizontal plane, and wherein said plurality of tertiary pipes cause said liquid to be redirected downward along a vertical plane prior to being expelled out of said outlets.

7. The device as recited in claim 6, further comprising a reducer coupling tip removably attached to said outlet of said plurality of tertiary pipes.

8. The device as recited in claim 7, further comprising a piercing tip removably attached to said reducer coupling tip.

9. The device as recited in claim 6, wherein said plurality of tertiary pipes have a narrower diameter than a diameter of said main pipe.

10. The device as recited in claim 6, wherein said plurality of secondary pipes consists of six secondary pipes and said plurality of tertiary pipes consists of six tertiary pipes.

11. The device as recited in claim 6, wherein said plurality of secondary pipes consists of two secondary pipes and said plurality of tertiary pipes consists of six tertiary pipes.

* * * * *